(12) United States Patent
Chopra et al.

(10) Patent No.: US 10,091,070 B2
(45) Date of Patent: Oct. 2, 2018

(54) SYSTEM AND METHOD OF USING A MACHINE LEARNING ALGORITHM TO MEET SLA REQUIREMENTS

(71) Applicant: Cisco Technology, Inc., San Jose, CA (US)

(72) Inventors: Danish Chopra, San Jose, CA (US); Anshu Narang, San Jose, CA (US); Inderpreet Bhullar, San Jose, CA (US); Hemant Patel, San Jose, CA (US); Shashidhar Srinivasa, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 252 days.

(21) Appl. No.: 15/170,040

(22) Filed: Jun. 1, 2016

(65) Prior Publication Data
US 2017/0353361 A1    Dec. 7, 2017

(51) Int. Cl.
*G06F 9/455* (2018.01)
*H04L 12/24* (2006.01)
*H04L 12/26* (2006.01)

(52) U.S. Cl.
CPC ........ *H04L 41/5009* (2013.01); *H04L 41/147* (2013.01); *H04L 43/16* (2013.01)

(58) Field of Classification Search
CPC ..... H04L 43/08; H04L 41/5009; H04L 43/16; H04L 41/50; H04L 41/5096
See application file for complete search history.

(56) References Cited

U.S. PATENT DOCUMENTS

| 5,970,064 A | 10/1999 | Clark et al. |
| 6,115,393 A | 9/2000 | Engel et al. |
| 6,298,351 B1 | 10/2001 | Castelli et al. |
| 6,597,684 B1 | 7/2003 | Gulati et al. |

(Continued)

FOREIGN PATENT DOCUMENTS

| CN | 102004671 B | 3/2013 |
| WO | 2015038152 A1 | 3/2015 |

OTHER PUBLICATIONS

International Search Report and Written Opinion by the International Searching Authority, dated Jul. 21, 2017, for the corresponding International Application No. PCT/US2017/033510, 14 pages.

(Continued)

*Primary Examiner* — Charles C Jiang
*Assistant Examiner* — Will Lin
(74) *Attorney, Agent, or Firm* — Polsinelli PC

(57) ABSTRACT

A method includes collecting, at a monitoring and recovery node, a virtual network function key performance index data through multiple channels from a corresponding containerized virtual network function. The method includes maintaining, at the monitoring and recovery node, state information of the corresponding containerized virtual network function and running, at the monitoring and recovery node, a machine learning algorithm that, once trained, learns and predicts whether the corresponding containerized virtual network function requires one of a scaling, a healing or a context switching to sister virtual network function to yield a determination and meet the service level agreement of a network service.

20 Claims, 5 Drawing Sheets

(56) References Cited

U.S. PATENT DOCUMENTS

| | | |
|---|---|---|
| 6,697,325 B1 | 2/2004 | Cain |
| 6,721,899 B1 | 4/2004 | Narvaez-Guarnieri et al. |
| 6,894,714 B2 | 5/2005 | Gutta, Sr. et al. |
| 6,954,617 B2 | 10/2005 | daCosta |
| 7,185,077 B1 | 2/2007 | O'Toole et al. |
| 7,453,864 B2 | 11/2008 | Kennedy et al. |
| 7,496,650 B1 | 2/2009 | Previdi et al. |
| 7,826,372 B1 | 11/2010 | Mabe et al. |
| 8,059,557 B1 | 11/2011 | Sigg et al. |
| 8,063,929 B2 | 11/2011 | Kurtz et al. |
| 8,154,583 B2 | 4/2012 | Kurtz et al. |
| 8,274,893 B2 | 9/2012 | Bansal et al. |
| 8,385,355 B1 | 2/2013 | Figueira et al. |
| 8,489,765 B2 | 7/2013 | Vasseur et al. |
| 8,620,840 B2 | 12/2013 | Newnham et al. |
| 8,630,291 B2 | 1/2014 | Shaffer et al. |
| 8,634,314 B2 | 1/2014 | Banka et al. |
| 8,638,778 B2 | 1/2014 | Lee et al. |
| 8,707,194 B1 | 4/2014 | Jenkins et al. |
| 8,767,716 B2 | 7/2014 | Trabelsi et al. |
| 8,774,164 B2 | 7/2014 | Klein et al. |
| 8,842,161 B2 | 9/2014 | Feng et al. |
| 8,856,584 B2 | 10/2014 | Matsubara |
| 8,862,522 B1 | 10/2014 | Jaiswal et al. |
| 8,880,477 B2 | 11/2014 | Barker et al. |
| 8,942,085 B1 | 1/2015 | Pani et al. |
| 9,324,022 B2 | 4/2016 | Williams, Jr. et al. |
| 9,338,065 B2 | 5/2016 | Vasseur et al. |
| 9,553,799 B2 | 1/2017 | Tarricone et al. |
| 9,558,451 B2 | 1/2017 | Nilsson et al. |
| 9,614,756 B2 | 4/2017 | Joshi |
| 2002/0061001 A1 | 5/2002 | Garcia-Luna-Aceves et al. |
| 2002/0101505 A1 | 8/2002 | Gutta et al. |
| 2002/0105904 A1 | 8/2002 | Hauser et al. |
| 2002/0116154 A1 | 8/2002 | Nowak et al. |
| 2002/0159386 A1 | 10/2002 | Grosdidier et al. |
| 2003/0005149 A1 | 1/2003 | Haas et al. |
| 2003/0061340 A1 | 3/2003 | Sun et al. |
| 2003/0091052 A1 | 5/2003 | Pate et al. |
| 2003/0117992 A1 | 6/2003 | Kim et al. |
| 2003/0133417 A1 | 7/2003 | Badt, Jr. |
| 2003/0225549 A1 | 12/2003 | Shay et al. |
| 2004/0153563 A1 | 8/2004 | Shay et al. |
| 2004/0218525 A1 | 11/2004 | Elie-Dit-Cosaque et al. |
| 2005/0111487 A1 | 5/2005 | Matta et al. |
| 2005/0114532 A1 | 5/2005 | Chess et al. |
| 2005/0143979 A1 | 6/2005 | Lee et al. |
| 2006/0072471 A1 | 4/2006 | Shiozawa |
| 2006/0083193 A1 | 4/2006 | Womack et al. |
| 2006/0116146 A1 | 6/2006 | Herrod et al. |
| 2006/0133404 A1 | 6/2006 | Zuniga et al. |
| 2007/0071030 A1 | 3/2007 | Lee |
| 2007/0083650 A1 | 4/2007 | Collomb et al. |
| 2007/0120966 A1 | 5/2007 | Murai |
| 2007/0149249 A1 | 6/2007 | Chen et al. |
| 2007/0192065 A1 | 8/2007 | Riggs et al. |
| 2008/0049622 A1 | 2/2008 | Previdi et al. |
| 2008/0089246 A1 | 4/2008 | Ghanwani et al. |
| 2008/0140817 A1 | 6/2008 | Agarwal et al. |
| 2008/0159151 A1 | 7/2008 | Datz et al. |
| 2008/0181259 A1 | 7/2008 | Andreev et al. |
| 2008/0192651 A1 | 8/2008 | Gibbings |
| 2008/0293353 A1 | 11/2008 | Mody et al. |
| 2009/0003232 A1 | 1/2009 | Vaswani et al. |
| 2009/0010264 A1 | 1/2009 | Zhang |
| 2009/0073988 A1 | 3/2009 | Ghodrat et al. |
| 2009/0129316 A1 | 5/2009 | Ramanathan et al. |
| 2009/0147714 A1 | 6/2009 | Jain et al. |
| 2009/0147737 A1 | 6/2009 | Tacconi et al. |
| 2009/0168653 A1 | 7/2009 | St Pierre et al. |
| 2009/0271467 A1 | 10/2009 | Boers et al. |
| 2009/0303908 A1 | 12/2009 | Deb et al. |
| 2010/0046504 A1 | 2/2010 | Hill |
| 2010/0165863 A1 | 7/2010 | Nakata |
| 2011/0082596 A1 | 4/2011 | Meagher et al. |
| 2011/0116389 A1 | 5/2011 | Tao et al. |
| 2011/0149759 A1 | 6/2011 | Jollota |
| 2011/0228696 A1 | 9/2011 | Agarwal et al. |
| 2011/0255570 A1 | 10/2011 | Fujiwara |
| 2011/0267962 A1 | 11/2011 | J S A et al. |
| 2012/0075999 A1 | 3/2012 | Ko et al. |
| 2012/0163177 A1 | 6/2012 | Vaswani et al. |
| 2012/0213062 A1 | 8/2012 | Liang et al. |
| 2012/0213124 A1 | 8/2012 | Vasseur et al. |
| 2012/0307629 A1 | 12/2012 | Vasseur et al. |
| 2013/0003542 A1 | 1/2013 | Catovic et al. |
| 2013/0010610 A1 | 1/2013 | Karthikeyan et al. |
| 2013/0028073 A1 | 1/2013 | Tatipamula et al. |
| 2013/0070755 A1 | 3/2013 | Trabelsi et al. |
| 2013/0128720 A1 | 5/2013 | Kim et al. |
| 2013/0177305 A1 | 7/2013 | Prakash et al. |
| 2013/0250754 A1 | 9/2013 | Vasseur et al. |
| 2013/0275589 A1 | 10/2013 | Karthikeyan et al. |
| 2013/0311673 A1 | 11/2013 | Karthikeyan et al. |
| 2014/0049595 A1 | 2/2014 | Feng et al. |
| 2014/0126423 A1 | 5/2014 | Vasseur et al. |
| 2014/0133327 A1 | 5/2014 | Miyauchi |
| 2014/0204759 A1 | 7/2014 | Guo et al. |
| 2014/0207945 A1 | 7/2014 | Galloway et al. |
| 2014/0215077 A1 | 7/2014 | Soudan et al. |
| 2014/0219103 A1 | 8/2014 | Vasseur et al. |
| 2014/0293955 A1 | 10/2014 | Keerthi |
| 2015/0023174 A1 | 1/2015 | Dasgupta et al. |
| 2015/0142702 A1 | 5/2015 | Nilsson et al. |
| 2015/0324689 A1 | 11/2015 | Wierzynski et al. |
| 2015/0358248 A1* | 12/2015 | Saha .................. H04L 43/0817 709/226 |
| 2016/0105345 A1 | 4/2016 | Kim et al. |
| 2016/0203404 A1 | 7/2016 | Cherkasova et al. |
| 2016/0315802 A1* | 10/2016 | Wei ........................ H04L 41/06 |
| 2016/0335111 A1* | 11/2016 | Bruun ................. G06F 9/45558 |
| 2017/0150399 A1* | 5/2017 | Kedalagudde ........ H04W 28/08 |
| 2017/0347308 A1 | 11/2017 | Chou et al. |
| 2018/0013656 A1* | 1/2018 | Chen ...................... H04L 43/16 |

OTHER PUBLICATIONS

Author Unknown, "White Paper on Service Enabler Virtualization," Draft dated Nov. 9, 2015, 26 pages, Open Mobile Alliance (OMA), San Diego, CA, USA.

Kuklinski, Slawomir, et al., "Design Principles of Generalized Network Orchestrators," 2016 IEEE International Conference on Communications Workshops (ICC), May 23, 2016, pp. 430-435.

Tang, Pengcheng, et al., "Efficient Auto-scaling Approach in the Telco Cloud using Self-learning Algorithm," 2015 IEEE Global Communications Conference (Globecom), Dec. 6, 2015, pp. 1-6.

Tang, Yongning, et al., "Automatic belief network modeling via policy interference for SDN fault localization," Journal of Internet Services and Applications, Jan. 20, 2016, pp. 1-13, Biomed Central Ltd., London, UK.

Akkaya, Kemal, et al., "A survey on routing protocols for wireless sensor networks" Abtract, 1 page, Ad Hoc Networks, May 2005.

Alsheikh, Mohammad Abu, et al., "Machine Learning in Wireless Sensor Networks: Algorithms, Strategies, and Applications," Mar. 19, 2015, 23 pages.

Baccour, Nouha, et al., "Radio Link Quality Estimation in Wireless Sensor Networks: A Survey," 2011, 35 pages.

Fan, Na, "Learning Nonlinear Distance Functions Using Neural Network for Regression with Application to Robust Human Age Estimation," Abstract, 1 page, IEEE International Conference on Computer Vision (ICCV), Nov. 2011, Institute of Electrical and Electronics Engineers, Barcelona, Spain.

Flushing, Eduardo Feo, et al.: "A mobility-assisted protocol for supervised learning of link quality estimates in wireless networks," Feb. 2012, 8 pages.

Fortunato, Santo, "Community Detection in Graphs", arXiv:0906.0612v2 [physics.soc-ph]; Physics Reports 486, 75-174, Jan. 25, 2010, 103 pages.

(56) References Cited

OTHER PUBLICATIONS

Godsill, Simon, et al., "Detection and suppression of keyboard transient noise in audio streams with auxiliary keybed microphone," Abstract, 1 page, 2015 IEEE International Conference on Acoustics, Speech and Signal Processing (ICASSP), Apr. 19-24, 2015, Brisbane, QLD, Australia (Abstract available at http://ieeexplore.ieee.org/document/7177995/, downloaded on Feb. 28, 2018.

Hershey, Shawn, et al., "CNN Architectures for Large-Scale Audio Classification," Jan. 10, 2017, 5 pages, Google, Inc., New York, NY, and Mountain View, CA, USA.

Hradis, Michael, et al., "Voice activity detection from gaze in video mediated communication," ACM, Mar. 28-30, 2012 http://medusa.fit.vutbr.cz/TA2/TA2. 4 pages.

Hui, J., et al., "An IPv6 Routing Header for Source Routes with the Routing Protocol for Low-Power and Lossy Networks (RPL)", Request for Comments 6554, Mar. 2012, 12 pages, Internet Engineering Task Force Trust.

Liu, Tao, et al., "Data-driven Link Quality Prediction Using Link Features," ACM Transactions on Sensor Networks, Feb. 2014, 35 pages.

McKenna, Shannon, et al., "Acoustic Event Detection Using Machine Learning: Identifying Train Events," Sep. 2017, pp. 1-5, http://cs229.stanford.edu/proj2012/McKennaMcLaren-AcousticEventDetectionUsingLearningIdentifyingTrainEvents.pdf, downloaded on Feb. 28, 2018.

Newman, M. E. J., "Analysis of weighted networks," Phys. Rev. E 70, 056131, Jul. 20, 2004, 9 pages, http://arxiv.org/pdf/condmat/0407503.pdf.

Newman, W. E. J., "Modularity and Community Structure in Networks", Proceedings of the National Academy of Sciences of the United States of America, Jun. 2006, vol. 103, No. 23, pp. 8577-8582, PNAS, Washington, DC.

Piczak, Karol J., "Environmental Sound Classification With Convolutional Neutral Networks," 2015 IEEE International Workshop on Machine Learning for Signal Processing, Sep. 17-20, 2015, Boston, USA.

Raghavendra, Kulkami V., et al., "Computational Intelligence in Wireless Sensor Networks: A Survey," Abstract, 1 page, IEEE Communications Surveys & Tutorials, May 27, 2010.

Salamon, Justin, et al., "Deep Convolutional Neutral Networks and Data Augmentation for Environmental Sound Classification," IEEE Signal Processing Letters, Accepted Nov. 2016, 5 pages.

Siddiky, Feroz Ahmed, et al., "An Efficient Approach to Rotation Invariant Face Detection Using PCA, Generalized Regression Neural Network and Mahalanobis Distance by Reducing Search Space," Abstract, 1 page, 10th International Conference on Computer and Information Technology, Dec. 2007, Dhaka, Bangladesh.

Singh, Shio Kumar, et al., "Routing Protocols in Wireless Sensor Networks—A Survey," International Journal of Computer Science & Engineering Survey (IJCSES) vol. 1, No. 2, Nov. 2010, pp. 63-83.

Ting, Jo-Anne, et al., "Variational Bayesian Least Squares: An Application to Brain-Machine Interface Data," Neural Networks, vol. 21, Issue 8, Oct. 2008, pp. 1112-1131, Elsevier.

Tsang, Yolanda, et al., "Network Radar: Tomography from Round Trip Time Measurements," ICM'04, Oct. 25-27, 2004, Sicily, Italy.

Vasseur, JP., et al., "Routing Metrics Used for Path Calculation in Low-Power and Lossy Networks," Request for Comments 6551, Mar. 2012, 30 pages, Internet Engineering Task Force Trust.

Winter, T., et al., "RPL: IPv6 Routing Protocol for Low-Power and Lossy Networks," Request for Comments 6550, Mar. 2012, 157 pages, Internet Engineering Task Force Trust.

Zhang, Xiaoju, et al., "Dilated convolution neutral network with LeakyReLU for environmental sound classification," Abstract, 1 page, 2017 $22^{nd}$ International Conference on Digital Signal Processing (DSP), Aug. 23-25, 2017, London, U.K.

Zinkevich, Martin, et al. "Parallelized Stochastic Gradient Descent," 2010, 37 pages.

\* cited by examiner

SYSTEM AND METHOD OF USING A MACHINE LEARNING ALGORITHM TO MEET SLA REQUIREMENTS

TECHNICAL FIELD

The disclosure relates generally to computer networking tools and particularly to a machine learning algorithm that operates to predict and implement actions that will enable the system to meet service level agreements (SLAs) for virtual network functions in a containerized environment.

BACKGROUND

In the network functions virtualization orchestrator world, there are a number of different challenges. Network Function Virtualization (NFV) technology, in combination with Software Defined Networking (SDN), promises to help transform today's carrier networks. It will transform how carrier networks are deployed and managed, and the way services are delivered. The ultimate goal is to enable service providers to reduce costs, increase business agility, and accelerate the time to market of new services.

NFV decouples network functions from underlying hardware so they run as software images on commercial off-the-shelf and purpose-built hardware. The NFV does so by using standard virtualization technologies (compute, network, and storage) to virtualize the network functions. The objective is to reduce the dependence on dedicated, specialized physical devices by allocating and using the physical and virtual resources only when and where needed. With this approach, service providers can reduce overall costs by shifting more components to a common physical infrastructure while optimizing its use, allowing them to respond more dynamically to changing market demands by deploying new applications and services as needed. The virtualization of network functions also enables the acceleration of time to market for new services because it allows for a more automated and streamlined approach to service delivery.

Simple examples demonstrating the benefit of a NFV service are a virtualized firewall or a load balancer. Instead of installing and operating a dedicated appliance to perform the network function, NFV allows operators to simply load the software image on a virtual machine (VM) on demand. In a mobile network, examples include virtualizing the mobile packet core functions such as packet data network gateway (PGW), serving gateway (SGW), mobile management entity (MME), and other elements.

NFV decouples the network function from the hardware. However, extracting maximum value from NFV-based services requires new orchestration capabilities.

Traditional orchestration, in the broader context of service fulfillment, is the process of coordinating and aligning business and operational processes in designing, creating, and delivering a defined service. This orchestration process involves the use and management of complex systems and tools such as order, inventory, and resource management systems; configuration and provisioning tools; and operations support systems (OSSs) combined with the processes associated with these tools and systems. Orchestration solutions play a critical role for service providers by automating tasks across technologies and organizations by integrating with business support systems (BSSs) and customer-relationship-management (CRM) systems orchestration and by ultimately reducing order-to-revenue time.

There are a number of challenges to the network functions virtualization orchestration. For example, the provisioning, monitoring and recovery of virtual network functions (VNFs) is mostly monolithic and performed by a single host machine. Next, an auto scaling/healing decision of the VNFs is based on an if-else condition in code. Further, there is no one standard for exposing VNF KPI (Key performance index) data to the Network Function Virtualization Orchestrator (NFVO). Finally, in the current status, there will be a network service downtime if a VNF or VNFs go down. In an NFV environment, the ability to maintain SLAs becomes even more complex due to the dynamic nature of the VNF and the underlying infrastructure. Hence the ability to predict and take action on network downtime becomes more critical.

In addition to the above issues, a network service can be composed of multiple VNFs from different vendors and spanning across multiple containers and virtual machines spawned on top of a variety of legacy hardware devices. This can result in a hybrid architecture. In a hybrid architecture, performing provisioning, recovery and meeting SLA requirements are difficult to meet. The system can have a difficult time making VNF scaling/healing decisions in an intelligent manner by taking a step beyond if-else conditions. Finally, in such a hybrid architecture described above in which data would be provided from such varying sources, it would be difficult to standardize or harmonize an approach of exposing VNF KPI (key performance index) data to an NFVO.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

Overview

Figure 1:
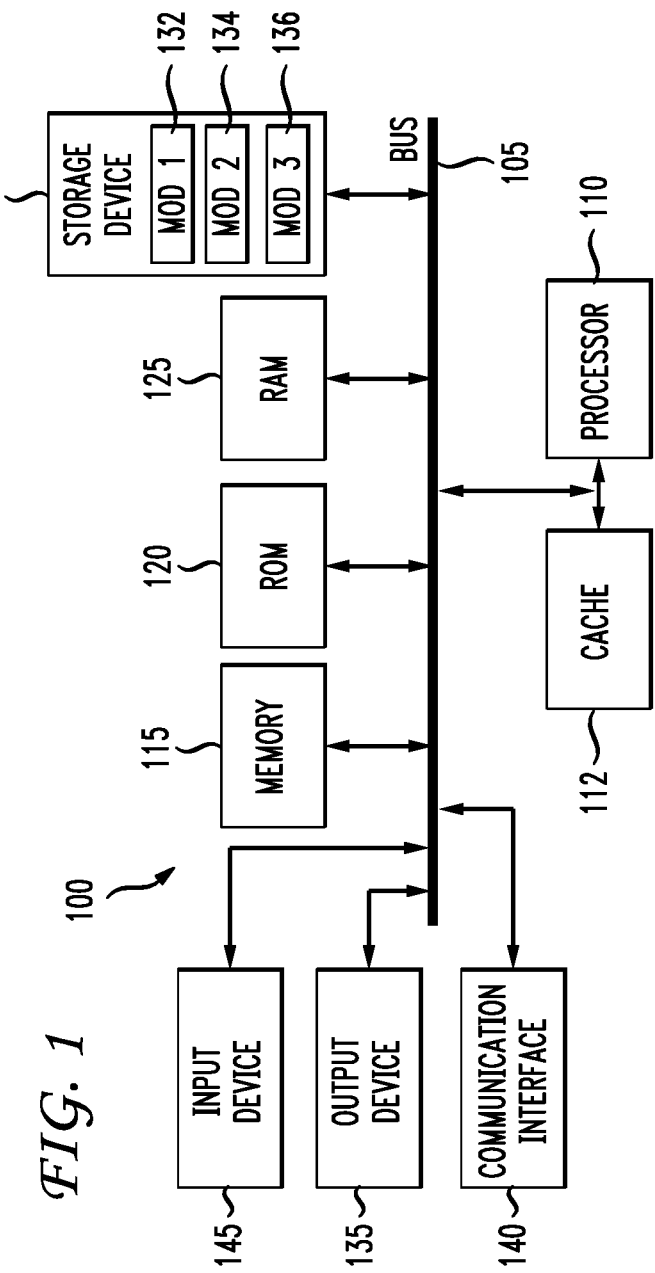
FIG. 1 illustrates the basic computing components of a computing device according to an aspect of this disclosure.

Disclosed are systems, methods and computer-readable devices related to a network service composed of multiple VNFs spanning multiple containers and virtual machines spawned on top of a variety of legacy hardware devices. In a method example, the method includes collecting, at a monitoring and recovery node, a virtual network function key performance index data through multiple channels from a corresponding containerized virtual network function. The method includes maintaining, at the monitoring and recovery node, state information of the corresponding containerized virtual network function and running, at the monitoring and recovery node, a machine learning algorithm that, once trained, learns and predicts whether the corresponding containerized virtual network function requires one of a scaling, a healing or a context switching to sister virtual network function to yield a determination.

An example machine learning algorithm which can be applicable to this scenario is the following:

$$T(s) = (\Sigma(M(v) + R(a))) \% T(m)$$

$$R(a) = R_{vnf}/R_{total} <= \text{global median resource usage}$$

$$T(m) = M(v)_{max} x + R(a)_{max}, \text{ where}$$

T(s) is a threshold for the scaling, the learning or the context switching to the sister virtual network function for the corresponding containerized virtual network function;

M(v) is a metric variable;

R(a) is an absolute individual resource usage for the corresponding containerized virtual network function out of multiple containerized virtual network functions;

$R_{vnf}$ is a resource usage for a given virtual network function;

$R_{total}$ is a total resource usage for a network service including a group of virtual network functions;

T(m) is a threshold maximum; and

Σ represents a summation from i=1 to N, wherein N is a number of times the threshold T(s) for the scaling, the healing or the context switching has succeeded; and when the T(s) threshold is met N times, providing an instruction to a provisioning node to perform one of the scaling, the healing and the context switching for the corresponding containerized virtual network function.

A benefit of the above approach is that within a network service including multiple VNFs from different vendors spanning across multiple containers and virtual machines spawned on top of a variety of legacy hardware devices, the disclosed system can implement a provisioning, monitoring, and recovery approach to meet a service level agreement.

DESCRIPTION

The present disclosure addresses the need of how to meet the service level agreement of a network service composed of multiple VNFs from different vendors spanning across multiple containers and virtual machines spawned on top of a variety of legacy hardware devices. The tool and concepts disclosed herein use an intelligent container micro architecture for monitoring and recovery of VNFs. The system also applies a new machine learning algorithm to anticipate imminent VNF scaling, healing and failure scenarios. The system automatically scales the VNF using new containers or auto heals the VNFs depending on the need. When the system predicts that the VNF may go down, the system context switches to a sister container in a hot standby mode to avoid network service downtime. This disclosure shall first describe in FIG. 1 some basic hardware component and then proceed to describe the context and concepts for monitoring and recovering VNFs.

The disclosure first turns to FIG. 1 which discloses some basic hardware components that can apply to system examples of the present disclosure. With reference to FIG. 1, an exemplary system and/or computing device 100 includes a processing unit (CPU or processor) 110 and a system bus 105 that couples various system components including the system memory 115 such as read only memory (ROM) 120 and random access memory (RAM) 125 to the processor 110. The system 100 can include a cache 112 of high-speed memory connected directly with, in close proximity to, or integrated as part of the processor 110. The system 100 copies data from the memory 115, 120, and/or 125 and/or the storage device 130 to the cache 112 for quick access by the processor 110. In this way, the cache provides a performance boost that avoids processor 110 delays while waiting for data. These and other modules can control or be configured to control the processor 110 to perform various operations or actions. Other system memory 115 may be available for use as well. The memory 115 can include multiple different types of memory with different performance characteristics. It can be appreciated that the disclosure may operate on a computing device 100 with more than one processor 110 or on a group or cluster of computing devices networked together to provide greater processing capability. The processor 110 can include any general purpose processor and a hardware module or software module, such as module 1 132, module 2 134, and module 3 136 stored in storage device 130, configured to control the processor 110 as well as a special-purpose processor where software instructions are incorporated into the processor. The processor 110 may be a self-contained computing system, containing multiple cores or processors, a bus, memory controller, cache, etc. A multi-core processor may be symmetric or asymmetric. The processor 110 can include multiple processors, such as a system having multiple, physically separate processors in different sockets, or a system having multiple processor cores on a single physical chip. Similarly, the processor 110 can include multiple distributed processors located in multiple separate computing devices, but working together such as via a communications network. Multiple processors or processor cores can share resources such as memory 115 or the cache 112, or can operate using independent resources. The processor 110 can include one or more of a state machine, an application specific integrated circuit (ASIC), or a programmable gate array (PGA) including a field PGA.

The system bus 105 may be any of several types of bus structures including a memory bus or memory controller, a peripheral bus, and a local bus using any of a variety of bus architectures. A basic input/output system (BIOS) stored in ROM 120 or the like, may provide the basic routine that helps to transfer information between elements within the computing device 100, such as during start-up. The computing device 100 further includes storage devices 130 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 130 is connected to the system bus 105 by a drive interface. The drives and the associated computer-readable storage devices provide non-volatile storage of computer-readable instructions, data structures, program modules and other data for the computing device 100. In one aspect, a hardware module that performs a particular function includes the software component stored in a tangible computer-readable storage device in connection with the necessary hardware components, such as the processor 110, bus 105, an output device such as a display 135, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the computing device 100 is a small, handheld computing device, a desktop computer, or a computer server. When the processor 110 executes instructions to perform "operations", the processor 110 can perform the operations directly and/or facilitate, direct, or cooperate with another device or component to perform the operations.

Although the exemplary embodiment(s) described herein employs a storage device such as a hard disk 130, other types of computer-readable storage devices which can store data that are accessible by a computer, such as magnetic cassettes, flash memory cards, digital versatile disks (DVDs), cartridges, random access memories (RAMs) 125, read only memory (ROM) 120, a cable containing a bit stream and the like, may also be used in the exemplary operating environment. According to this disclosure, tangible computer-readable storage media, computer-readable storage devices, computer-readable storage media, and computer-readable memory devices, expressly exclude media such as transitory waves, energy, carrier signals, electromagnetic waves, and signals per se.

To enable user interaction with the computing device 100, an input device 145 represents any number of input mechanisms, such as a microphone for speech, a touch-sensitive screen for gesture or graphical input, keyboard, mouse, motion input, speech and so forth. An output device 135 can also be one or more of a number of output mechanisms known to those of skill in the art. In some instances, multimodal systems enable a user to provide multiple types of input to communicate with the computing device 100. The communications interface 140 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 110. The functions these blocks represent may be provided through the use of either shared or dedicated hardware, including, but not limited to, hardware capable of executing software and hardware, such as a processor 110, that is purpose-built to operate as an equivalent to software executing on a general purpose processor. For example the functions of one or more processors presented in FIG. 1 can be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 120 for storing software performing the operations described below, and random access memory (RAM) 125 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage devices. Such logical operations can be implemented as modules configured to control the processor 110 to perform particular functions according to the programming of the module. For example, FIG. 1 illustrates three modules Mod1 132, Mod2 134 and Mod3 136 which are modules configured to control the processor 110. These modules may be stored on the storage device 130 and loaded into RAM 125 or memory 115 at runtime or may be stored in other computer-readable memory locations.

One or more parts of the example computing device 100, up to and including the entire computing device 100, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 110 can include all types of processors disclosed herein, including a virtual processor. However, when referring to a virtual processor, the processor 110 includes the software components associated with executing the virtual processor in a virtualization layer and underlying hardware necessary to execute the virtualization layer. The system 100 can include a physical or virtual processor 110 that receive instructions stored in a computer-readable storage device, which cause the processor 110 to perform certain operations. When referring to a virtual processor 110, the system also includes the underlying physical hardware executing the virtual processor 110.

Figure 2:
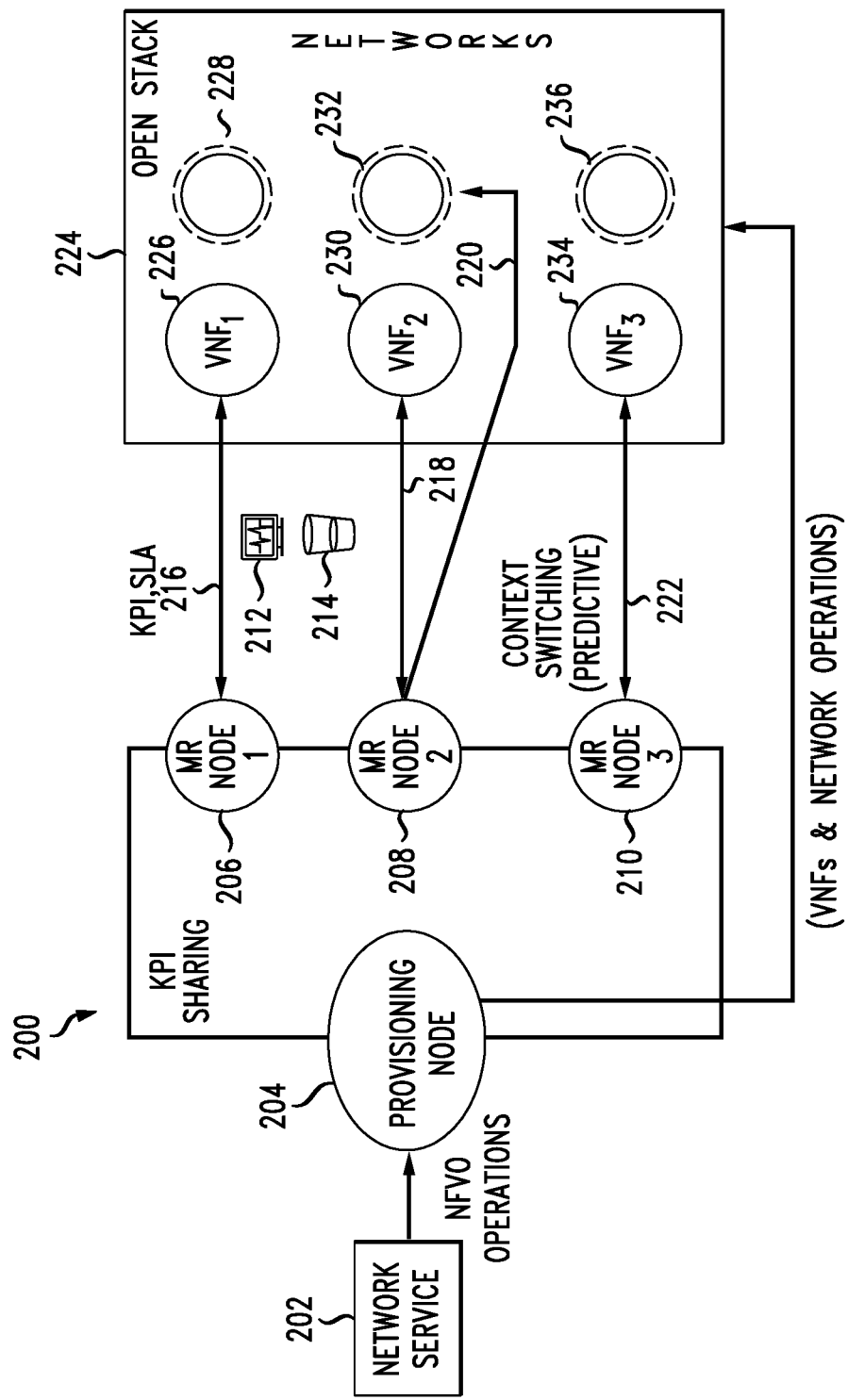
FIG. 2 illustrates the general context in which the present disclosure applies.

Having discussed the basic computing components that can apply to a system example of the present disclosure, the disclosure now turns to FIG. 2 which illustrates the intelligent network function virtualization container micro architecture 200. The solution disclosed includes a network service 202 that provisions components such as a network 224 using a provisioning node 204 which runs inside a docker container set up in a high availability mode. The provisioning node 204 performs functions including, for example, provisioning, upgrading, downgrading and deleting the network 224 which is composed of multiple VNFs 226, 230, 234 running inside docker containers and virtual machines. A docker container is a form of virtualization that allows the hardware power to be shared among different users and appear as separate servers or machines. Docker containers virtualize the operating system, splitting it into virtualized compartments to run container applications. The provisioning node 204 is also responsible for performing resource management, occupant management, and ordering of VNFs, among other NFVO operations. The provisioning node 204 is further responsible for creating individual monitoring and recovering (M/R) nodes 206, 208, 210 which are connected to the provisioning node 204 through an overlay network.

The provisioning node 204 is also responsible for scaling up/down, healing and context switching operations on the network service based on predictive information received from a M/R node 206, 208, 210.

The M/R nodes 206, 208, 210 are light weight docker containers set up in high availability mode and are responsible for monitoring, recovering and meeting service level agreement (SLA) requirements of individual VNFs. The M/R nodes 206, 208, 210 are light weight because they have a comparatively light processing overhead relative to virtual machines that emulate the hardware layer. The M/R nodes 206, 208, 210 will collect VNF KPI (key performance index) data and other VNF related information received through one or more channels 216 such as CPU usage, memory usage, disk usage, network delay, network round trip time, as well as VNF error data through log files 212. The collecting and or learning steps can be continuous, periodic, or performed at certain strategic times. The M/R nodes 206, 208, 210 also collect overall system health information from Open Stack. Open Stack is an open-source software platform for cloud computing which is mostly deployed as an infrastructure-as-a-service (IaaS). Open Stack consists of interrelated components that control hardware pools of processing, storage, and networking resources throughout a data center.

The M/R nodes 206, 208, 210 also maintain the state of the containerized VNFs 214 so that a context switch 220 to a sister VNF 228, 232, 236 is possible in case the main VNF fails. FIG. 2 shows a context switch 220 to the sister VNF 232. The context switch 220 is representative of any M/R node 206, 208, 210 making a context switch from a respective associated VNF 226, 230, 234 to a respective sister VNF 228, 232, 236. One or more VNF(s) can context switch to one or more sister VNF(s).

The M/R nodes 206, 208, 210 each run a machine learning algorithm responsible for learning and predicting if the containerized main VNFs 226, 230, 234 require scaling or healing or some other action. For example, the algorithm may determine that a VNF is likely to fail based on data collected as mentioned above. The prediction is sent to the provisioning node 204 and based on the prediction, the provisioning node 204 will take the appropriate steps. For example, if one or more of CPU usage, memory usage, disk usage, network delay, network round trip, and so forth spike in usage such that they are going to overwhelm the system, or are on a trajectory or exhibit a pattern that, based on previous experiences as seen in the training data for the machine learning algorithm, will lead to VNF failure, then the system can predict that a failure is going to happen if the appropriate steps are not taken.

Based on the output of the machine learning algorithm, the provisioning node 204 will perform one or more of (1) a scaling operation in which the provisioning node 204 automatically scales the network service by adding (and/or removing) VNF instances through new docker containers or virtual machines, as required; (2) a healing operation in which case a VNF requires some type of healing action, and the provisioning service node 204 performs that function; and (3) a failing action in which case a VNF is likely to fail, and the provisioning node 204 causes a context switch from the failing VNF to the associated sister VNF in hot standby mode before the VNF goes down to avoid network service downtime. With respect to item (2) above, the scaling operation can include removing a docker container or a virtual machine based on a virtual network function scaling requirement or policy.

The VNF KPI data is collected by the M/R nodes 206, 208, 210 continuously and through multiple channels 216 such as IPSLA, NETCONF, SNMP, etc. IPSLA stands for "Internet Protocol Service Level Agreement." It is a feature of the Cisco Internetwork Operating System that allows an IT professional to collect information about network performance in real time. Any reference to IPSLA can refer to any SLA that is similar in nature or purpose as the Cisco version. NETCONF is a protocol defined by the IETF (the Internet Engineering Task Force) to install, manipulate and delete the configuration of network devices. The NETCONF operations are realized on top of a Remote Procedure Call (RPC) layer using an XML encoding. NETCONF provides a basic set of operations to edit and query configuration data on a network device. The SNMP (Simple Network Management Protocol) is an Internet-standard protocol for collecting and organizing information about managed devices on IP networks and for modifying that information to change device behavior. There is no requirement that the data be retrieved from any particular channel or standard. All the various standards and channels are supported. For example, in one aspect, a simple mechanism that VNF vendors can follow to expose the KPI data of the VNFs to the NFVO through a standard TCP port on the VNF linux machine can be established.

The M/R nodes 206, 208, 210 can listen at the defined TCP port at regular interval through a secure shell (SSH tunnel. The following format could be used:

```
<kpi>
    <variable-name>Network Latency</variable-name>
    <variable-value>200</variable-value>
</kpi>
```

Next is described the machine learning algorithm which is formulated to predict scaling, healing or failure scenarios of a VNF based on different system parameters. The equation is used by a decision tree (see FIG. 3) during a learning/training phase. An example equation is as follows:

Machine Learning Algorithm $$T(s) = (\Sigma(M(v) + R(a)))\%T(m)$$

$$R(a) = R_{vnf}/R_{total} <= \text{global median resource usage}$$

$$T(m) = M(v)_{max} + R(a)_{max}, \text{ where}$$

T(s) is a threshold for the scaling, the learning or the context switching to the sister virtual network function for the corresponding containerized virtual network function;

M(v) is a metric variable;

R(a) is an absolute individual resource usage for the corresponding containerized virtual network function out of multiple containerized virtual network functions on one VIM (Virtual infrastructure manager) or multiple VIMS;

$R_{vnf}$ is a resource usage for a given virtual network function;

$R_{total}$ is a total resource usage for a network service comprising a group of virtual network functions;

T(m) is a threshold maximum; and

The symbol "Σ" is a summation from i=1 to N, wherein N is a number of times the threshold T(s) for the scaling, the healing or the context switching has succeeded.

When the T(s) threshold is met N times, the system provides an instruction to a provisioning node to perform one of the scaling, the healing and the context switching for the corresponding containerized virtual network function.

Figure 3:
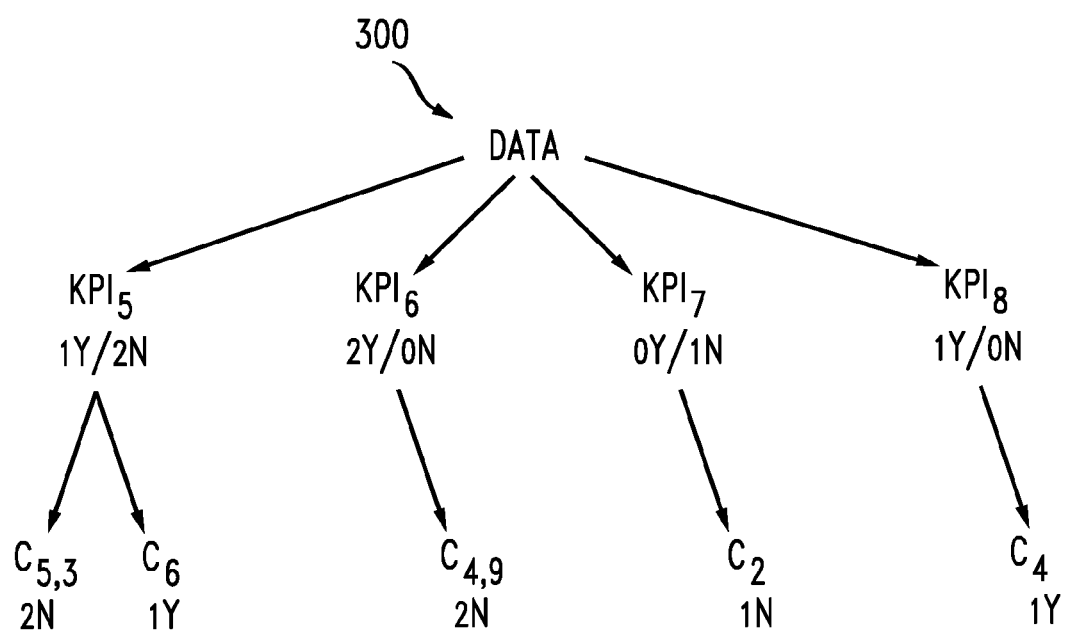
FIG. 3 illustrates a decision tree according to an aspect of this disclosure.
Figure 4:
FIG. 4 illustrates a table of various values for different time periods N according to the disclosure.

FIG. 3 illustrates using the decision tree for prediction. Another step in the process is to distribute training data in sets as shown in tree 300. Training data provides example input regarding system parameters such as KPI data and decisions based on the input to train the decision tree. FIG. 4 illustrates training data. In a further step, the system runs the algorithm and predicts, based on the training data, and again feeds the data into the decision tree for further training. For example, based on the data and the decision tree shown, here are some example inputs/outputs: KPI=5, C=6, P=YES. In this example, the KPI value was 5, the compute value was 6 and the prediction was YES, take an action to scale, heal or recover. Other examples include: KPI=7, C=2, P=NO; KPI=8, C=4, P=YES; KPI=5, C=5, P=NO. Feeding the prediction back into the decision tree is how the system can learn over time. As the decision tree grows more dense, the predictions will improve and the confidence in the predictions will further improve as well.

FIG. 4 illustrates data 400 used to feed the decision tree with sample KPI data and other system parameters such as the "compute" parameters as a learning/training set. For purposes of simplicity, only 1 KPI variable and 1 metric variable have been shown. In reality, the tool makes use of multiple KPI's based on SLA and multiple metric variables as explained above. The first step in the process is to use the sample VNF data as a training set for the decision tree based on heuristics, SLA specification and human data. Ultimately, as shown in the right column of the table, the equation above will produce a decision to scale, heal or recover.

Figure 5:
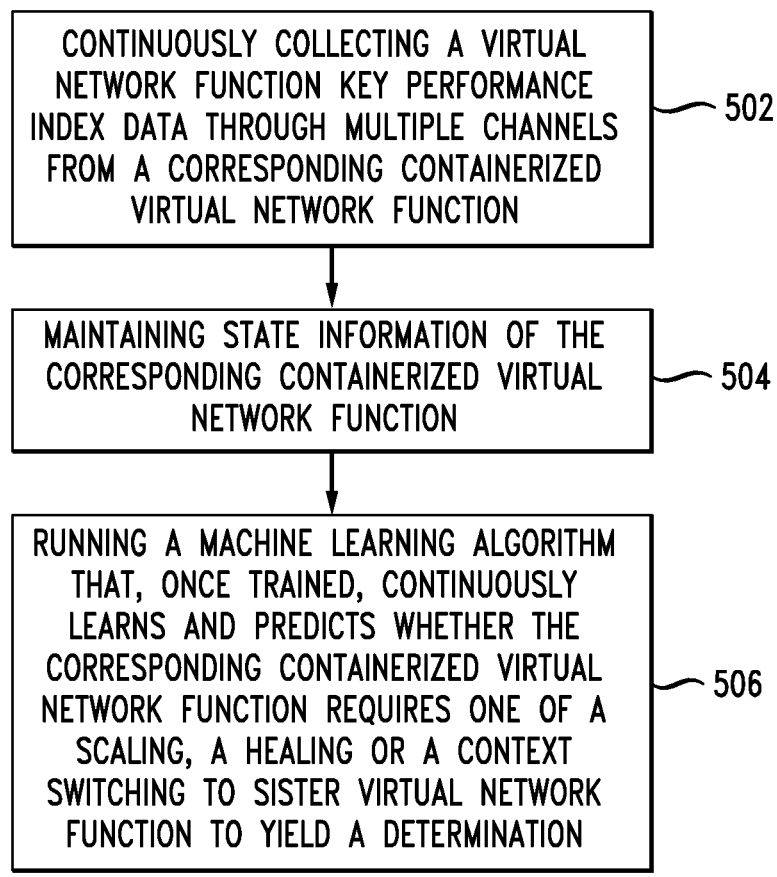
FIG. 5 illustrates a method example of this disclosure.

FIG. 5 illustrates a method example of the present concepts. The method can be practiced on any particular node. It is preferable that the method is practiced on one of the M/R nodes 206, 208, 210 but it is not a requirement that any particular piece of hardware or virtualization object perform the steps. The method could be practiced on one or more hardware or virtual components. The method includes collecting a virtual network function key performance index data through one or more channels from a corresponding containerized virtual network function (step 502), maintaining state information of the corresponding containerized virtual network function (step 504), and running a machine learning algorithm that, once trained, learns and predicts whether the corresponding containerized virtual network function requires one of a scaling, a healing, or a context switching to sister virtual network function to yield a determination (step 506). The collecting and learning/predicting can be continuous, intermittent, or scheduled at particular times. An example machine learning algorithm is set forth above. The N value can be set through heuristics considering an optimal or preferred maximum for all VNFs to avoid false positives. If, even after N, (T(s)=1), that means the VNF needs scaling, healing or recovery depending on the context. The service might have other VNFs as well with their own T(s) values. Other machine learning algorithms with similar functionality to the above algorithm are also contemplated.

The collecting and running steps can occur at a M/R node 206, 208, 210. The step of maintaining state information of the corresponding containerized virtual network function can also occur at the M/R node 206, 208, 210. When the T(s) threshold is met N times, and the determination from the machine learning algorithm indicates an action should be taken, the method can include providing an instruction to a provisioning node 204 to perform one of the scaling, the healing or the context switching for the corresponding containerized virtual network function. For example, N could be 3 such that the threshold needs to be met three times before a scaling occurs. The step of collecting the virtual network function key performance index data can occur through multiple channels, such as two or more of the IPSLA, the NETCONF, and the SNMP channels.

When the machine learning algorithm predicts that the corresponding containerized virtual network function requires scaling, the method will include providing an instruction to the provisioning node 204 to add a new virtual network function instance. The provisioning node 204 can then add the new virtual network function instance using a new docker container or a virtual machine as would be understood by one of skill in the art. The provisioning node 204 can also remove a docker container or a virtual machine based on a virtual network function scaling requirement or policy. The decision can also mean scale down a VNF and, in such a case, the associated container is stopped or removed.

The various aspects disclosed herein can be implemented as hardware, firmware, and/or software logic embodied in a tangible, i.e., non-transitory, medium that, when executed, is operable to perform the various methods and processes described above. That is, the logic may be embodied as physical arrangements, modules, or components. A tangible medium may be substantially any computer-readable medium that is capable of storing logic or computer program code which may be executed, e.g., by a processor or an overall computing system, to perform methods and functions associated with the examples. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, computer-readable storage device, or a machine-readable medium excludes signals or signals embodied in carrier waves.

The steps associated with the methods of the present disclosure may vary widely. Steps may be added, removed, altered, combined, and reordered without departing from the spirit of the scope of the present disclosure. For example, a broader characterization of the machine learning algorithm could also apply. A method aspect can include collecting, at a monitoring and recovery node, a virtual network function key performance index data through multiple channels from a corresponding containerized virtual network function. The method can include maintaining, at the monitoring and recovery node, state information of the corresponding containerized virtual network function and running, at the monitoring and recovery node, a machine learning algorithm that, once trained, learns and predicts whether the corresponding containerized virtual network function requires one of a scaling, a healing or a context switching to sister virtual network function to yield a determination. The collecting and/or the learning can be continuous or intermittent. The machine learning algorithm can be based on one or more of the following parameters: a threshold for scaling, an absolute individual resource usage for a corresponding containerized virtual network function out of multiple containerized virtual network functions, a resource usage for a given virtual network function, a total resource usage for a network service including a group of virtual network functions, a threshold maximum and a summation related to a number of times a threshold for a scaling, and whether the healing or the context switching has succeeded. Therefore, the present examples are to be considered as illustrative and not restrictive, and the examples is not to be limited to the details given herein, but may be modified within the scope of the appended claims.

What is claimed is:

1. A method comprising:
   collecting a virtual network function key performance index data from a corresponding containerized virtual network function;
   maintaining state information of the corresponding containerized virtual network function;
   running a machine learning algorithm that, once trained, learns and predicts whether the corresponding containerized virtual network function requires one of a scaling, a healing or a context switching to sister virtual network function to yield a determination;
   executing the predicted scaling, the predicted healing, or the predicted context switching of the virtual network function in response to the predictions;

wherein the machine learning algorithm comprises:

$$T(s)=(\Sigma(M(v)+R(a)))\%T(m)$$

$$R(a)=R_{vnf}/R_{total}<=\text{global median resource usage}$$

$$T(m)=M(v)_{max}+R(a)_{max}, \text{ where}$$

T(s) is a threshold for the scaling, the healing or the context switching to the sister virtual network function for the corresponding containerized virtual network function;

M(v) is a metric variable;

R(a) comprises an absolute individual resource usage for the corresponding containerized virtual network function out of multiple containerized virtual network functions;

$R_{vnf}$ comprises a resource usage for a given virtual network function;

$R_{total}$ comprises a total resource usage for a network service comprising a group of virtual network functions;

T(m) is a threshold maximum; and

Σ comprises a summation from i=1 to N, wherein N is a number of times the threshold T(s) for the scaling, the healing or the context switching has succeeded.

2. The method of claim 1, wherein the collecting and running steps occur at a monitoring and recovery node.

3. The method of claim 1, further comprising, when the T(s) threshold is met N times, and the determination indicates an action should be taken, providing an instruction to a provisioning node to perform one of the scaling, the healing and the context switching for the corresponding containerized virtual network function.

4. The method of claim 1, wherein the step of collecting the virtual network function key performance index data occurs through multiple channels.

5. The method of claim 4, wherein the multiple channels comprise at least two of IPSLA, NETCONF, and SNMP.

6. The method of claim 3, wherein when the machine learning algorithm predicts that the corresponding containerized virtual network function requires scaling, providing an instruction to the provisioning node to add a new virtual network function instance.

7. The method of claim 6, wherein the provisioning node adds the new virtual network function instance using a new docker container or a virtual machine.

8. A system comprising:
a processor; and
a computer-readable medium, storing instructions which, when executed by the processor, cause the processor to perform operations comprising:
collecting a virtual network function key performance index data from a corresponding containerized virtual network function;
maintaining state information of the corresponding containerized virtual network function;
running a machine learning algorithm that, once trained, learns and predicts whether the corresponding containerized virtual network function requires one of a scaling, a healing or a context switching to sister virtual network function to yield a determination;
executing the predicted scaling, the predicted healing, or the predicted context switching of the virtual network function in response to the predictions;
wherein the machine learning algorithm comprises:

$$T(s)=(\Sigma(M(v)+R(a)))\%T(m)$$

$$R(a)=R_{vnf}/R_{total}<=\text{global median resource usage}$$

$$T(m)=M(v)_{max}+R(a)_{max}, \text{ where}$$

T(s) is a threshold for the scaling, the healing or the context switching to the sister virtual network function for the corresponding containerized virtual network function;

M(v) is a metric variable;

R(a) comprises an absolute individual resource usage for the corresponding containerized virtual network function out of multiple containerized virtual network functions;

$R_{vnf}$ comprises a resource usage for a given virtual network function;

$R_{total}$ comprises a total resource usage for a network service comprising a group of virtual network functions;

T(m) is a threshold maximum; and

Σ comprises a summation from i=1 to N, wherein N is a number of times the threshold T(s) for the scaling, the healing or the context switching has succeeded.

9. The system of claim 8, wherein the collecting and running steps occur at a monitoring and recovery node.

10. The system of claim 8, wherein the computer-readable medium stores instructions which, when executed by the processor, cause the processor to perform further operations comprising, when the T(s) threshold for scaling is met N times, and the determination indicates an action should be taken, providing an instruction to a provisioning node to perform one of the scaling, the healing and the context switching for the corresponding containerized virtual network function.

11. The system of claim 8, wherein the step of collecting the virtual network function key performance index data occurs through multiple channels.

12. The system of claim 11, wherein the multiple channels comprise at least two of IPSLA, NETCONF, and SNMP.

13. The system of claim 10, wherein when the machine learning algorithm predicts that the corresponding containerized virtual network function requires scaling, providing an instruction to the provisioning node to add a new virtual network function instance.

14. The system of claim 13, wherein the provisioning node adds the new virtual network function instance using a new docker container or a virtual machine.

15. A computer-readable storage device storing instructions which, when executed by a processor, cause the processor to perform operations comprising:
collecting a virtual network function key performance index data from a corresponding containerized virtual network function;
maintaining state information of the corresponding containerized virtual network function;
running a machine learning algorithm that, once trained, learns and predicts whether the corresponding containerized virtual network function requires one of a scaling, a healing or a context switching to sister virtual network function to yield a determination,
executing the predicted scaling, the predicted healing, or the predicted context switching of the virtual network function in response to the predictions;
wherein the machine learning algorithm comprises:

$$T(s)=(\Sigma(M(v)+R(a)))\% \ T(m)$$

$$R(a)=R_{vnf}/R_{total}<=\text{global median resource usage}$$

$$T(m)=M(v)_{max}+R(a)_{max}, \text{ where}$$

T(s) is a threshold for the scaling, the healing or the context switching to the sister virtual network function for the corresponding containerized virtual network function;

M(v) is a metric variable;

R(a) comprises an absolute individual resource usage for the corresponding containerized virtual network function out of multiple containerized virtual network functions;

$R_{vnf}$ comprises a resource usage for a given virtual network function;

$R_{total}$ comprises a total resource usage for a network service comprising a group of virtual network functions;

T(m) is a threshold maximum; and

Σ comprises a summation from i=1 to N, wherein N is a number of times the threshold T(s) for the scaling, the healing or the context switching has succeeded.

16. The computer-readable storage device of claim 15, wherein the collecting and running steps occur at a monitoring and recovery node.

17. The computer-readable storage device of claim 15, wherein the computer-readable device stores additional instructions which, when executed by the processor, cause the processor to perform further operations comprising, when the T(s) threshold for scaling is met N times, and the determination indicates an action should be taken, providing an instruction to a provisioning node to perform one of the scaling, the healing and the context switching for the corresponding containerized virtual network function.

18. The computer-readable storage device of claim 15, wherein the step of collecting the virtual network function key performance index data occurs through multiple channels.

19. The computer-readable storage device of claim 18, wherein the multiple channels comprise at least two of IPSLA, NETCONF, and SNMP.

20. The computer-readable storage device of claim 15, wherein when the machine learning algorithm predicts that the corresponding containerized virtual network function requires scaling, providing an instruction to the provisioning node to add a new virtual network function instance.

\* \* \* \* \*